United States Patent [19]
Kawai

[11] Patent Number: 5,402,186
[45] Date of Patent: Mar. 28, 1995

[54] TELEVISION SIGNAL PROCESSOR FOR CONVERTING THE NUMBER OF SCANNING LINES IN A TELEVISION SIGNAL

[75] Inventor: Kiyoyuki Kawai, Kanagawa, Japan

[73] Assignee: Kabushiki Kaisha Toshiba, Kawasaki, Japan

[21] Appl. No.: 117,000

[22] Filed: Sep. 7, 1993

[30] Foreign Application Priority Data

Sep. 4, 1992 [JP] Japan .................. 4-237363

[51] Int. Cl.$^6$ ............................................. H04N 7/01
[52] U.S. Cl. ........................................ 348/448; 348/458
[58] Field of Search ................... 358/140, 11, 141; H04N 7/01; 348/448, 458

[56] References Cited

U.S. PATENT DOCUMENTS

| | | | |
|---|---|---|---|
| 5,012,326 | 4/1991 | Sakamoto et al. | 358/141 X |
| 5,157,490 | 10/1992 | Kawai et al. | 358/141 |
| 5,161,003 | 11/1992 | Yasuki et al. | 358/141 |
| 5,179,443 | 1/1993 | Sugimori et al. | 358/140 X |
| 5,182,644 | 1/1993 | Kimata et al. | 358/141 X |
| 5,204,745 | 4/1993 | Kawai et al. | 358/140 |

FOREIGN PATENT DOCUMENTS

| | | |
|---|---|---|
| 0467376 | 1/1992 | European Pat. Off. . |
| 43151 | 1/1992 | Japan . |

OTHER PUBLICATIONS

Achiha et al., Motion-Adaptive Enchanced Decoder and Up-Converter for PAL Signals, Broadcast Sessions, Jun. 1991, pp. 197-208.
Sugimori et al., An NTSC-Compatible Wide-Aspect Advanced Television System, HDTV '90 TVHD, Jun. 1990, pp. 5A.6.1-5A.6.14.
Patent Abstracts of Japan, vol. 3, No. 156 (E-161) Dec. 1979 re JP-A-54 138 325.

*Primary Examiner*—Victor R. Kostak
*Attorney, Agent, or Firm*—Cushman, Darby & Cushman

[57] ABSTRACT

A television signal processor including a device for generating a frame signal, which represents a moving picture, by combining a first field and a second field of an interlace scanning input signal, a filter for separating the frame signal into a vertical low frequency component and a vertical high frequency component, a device for doubling the frame frequency by a frame progressive operation of the vertical low frequency component, a device for converting the vertical high frequency component into a second vertical low frequency component by shifting the frequency of the vertical high frequency component and for converting the vertical high frequency component into a temporal high frequency component by doubling the frequency of the frame signal, and a device for generating a moving picture signal by combining the temporal high frequency component with the double frame-frequency signal produced by the frame progressive operation of the vertical low frequency component. The processor may double the frequencies of the first and second fields, prior to filtering, instead of performing frequency doubling after filtering.

7 Claims, 4 Drawing Sheets

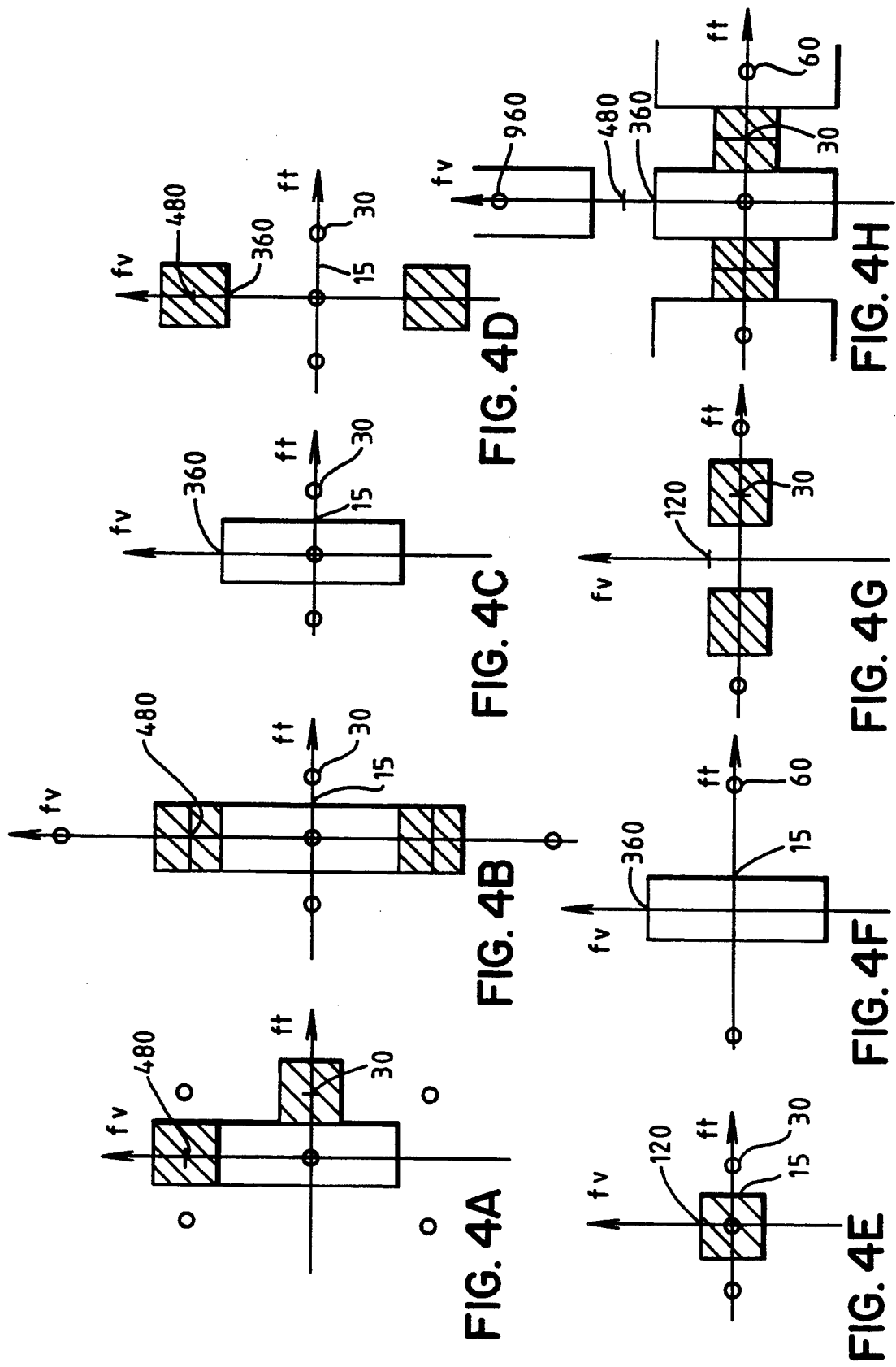

TELEVISION SIGNAL PROCESSOR FOR CONVERTING THE NUMBER OF SCANNING LINES IN A TELEVISION SIGNAL

FIELD OF THE INVENTION

The present invention relates generally to a television signal processor, and more particularly, to a television signal processor for converting the number of scanning lines of a television signal.

BACKGROUND OF THE INVENTION

Techniques for converting the number of scanning lines of a television signal are known, as disclosed, for example, in the Laid-Open Japanese Patent Sho.54-138325 and the Published Japanese Patent Hei.4-3151.

FIG. 1 shows such a conventional scanning line conversion circuit, as disclosed in the Published Japanese Patent Hei.4-3151. This conventional circuit receives an interlace scanning signal at its input, and then converts it to a progressive scanning signal. The circuit generates a progressive scanning signal having scanning lines which are twice that of the input interlace scanning signal, by compressing the time axes of the interlace scanning signal and an interpolated signal obtained from the interlace scanning signal. The interpolated signal is obtained by adapting a motion. The interpolated signal production mode has a still picture mode and a moving picture mode. In the still picture mode, the interpolated signal is produced by an inter-field image processing for corresponding scanning line signals in two adjacent fields. In the moving picture mode, the interpolated signal is produced by an intra-field image processing for two adjacent scanning line signals in the same field. The inter-field image processing and the intra-field image processing are selectively implemented in response to a motion signal detected by a motion detector.

In FIG. 1, an input signal is placed on input terminal 312 and is then supplied to field memory 315 via field memory 314. The input signal and the output of field memory 315 are supplied to field memory 315. The output of subtractor 319 is also supplied to coefficient multiplier 322 as a still picture signal for use in the inter-field image processing. Subtractor 319 outputs a motion signal. This motion signal controls coefficient multipliers 321 and 322 via motion detector 320. The output of field memory 314 is supplied to line memory 316. The output of field memory 314 is also supplied to adder 317. Adder 317 adds the outputs of line memory 316 and field memory 314 together. The output of adder 317 is then supplied to ½ coefficient multiplier 318. The output of coefficient multiplier 318, which represents an intra-field interpolation signal effective for moving pictures, is supplied to adder 323 via coefficient multiplier 321. Adder 323 combines the outputs of coefficient multiplier 321 and coefficient multiplier 322, respectively representing the motion picture and the still picture. The output of adder 323 is then supplied to time compressor 325. The output of time compressor 325 is supplied to selector 326. Selector 326 also receives another time compression signal from time compressor 324. The time compressor 324 is directly coupled to field memory 314, so that the time compression signal from time compressor 324 represents the original interlaced scanning signal on input terminal 312. Selector 326 alternately selects the original interlaced signal and its line interpolation signal. According to the conventional system as described above, coefficient multiplier 321 is supplied with the intra-field image processing signal, while coefficient multiplier 322 is supplied with the inter-field image processing signal. Coefficient multipliers 321 and 322 are, however, commonly controlled by motion detector 320.

In the conventional system as described above, the inter-field image processing, with respect to still pictures, can be effectively executed thus improving a vertical resolution of images and eliminating inter-line flickers of images. However, in its intra-field image processing, with respect to moving pictures, the quality of the moving picture is inferior to that of the still pictures due to the fact that the processing of the moving pictures are executed within a same field. For example, in the NTSC system the number of effective scanning lines is about 480 lines per frame (or 240 lines per field). Consequently, as to still pictures, the inter-field image processing can be carried out for all of the 480 scanning lines in one frame. Therefore a vertical resolution around 480 lph (line per screen height) is obtained. On the other hand, since moving pictures are processed by the intra-field image processing, information on merely 240 scanning lines is used. Therefore, the vertical resolution for the moving pictures is principally limited to 240 lph. Further, since the image processing is based on existing filters the practical resolution is further reduced. According to the image processing by the conventional circuit as shown in FIG. 1, the filter for intra-field image processing has a square-cosine characteristic of 0 dB at the vertical spatial frequency of 0 lph, −6 (minus 6) dB at 240 lph and −∞ (minus infinity) dB at 480 lph.

This characteristic means as follows. Firstly, since the frequency response characteristics of the filter passing band is not flat, signal components in the vicinity of 240 lph are attenuated. This frequency response characteristics has a great influence on vertical image sharpness. That is, a blurring of images increases so that the picture quality deteriorates significantly. Secondly, vertical high frequency components at or above the 240 lph, which have not been completely attenuated in the filter, act as aliasing noises causing the picture quality to be significantly deteriorated. Therefore, in the conventional circuit a relatively high quality image can be achieved for the still picture. However, since image processing for the moving picture is insufficient in comparison to that of the still pictures a great difference occurs between the picture qualities in the still pictures and the moving pictures, thus resulting a very unnatural image in the motion adaptive image processing.

In the conventional television signal processor for converting the number of scanning lines, a high quality image can be obtained with the still picture, but when the motion adaptive converting operation is executed, a great picture quality difference between the still picture and the moving picture occurs due to the insufficiency of the picture quality of the moving picture, as described above. Therefore, this results in very unnatural images.

SUMMARY OF THE INVENTION

It is, therefore, an object of the present invention to provide a television signal processor for converting an interlace scanning signal to a progressive scanning signal which is capable of achieving an improved picture quality for moving pictures.

According to the present invention a television signal processor comprises means for generating a frame signal, which represents a moving picture, by combining a first field and a second field of an interlace scanning input signal. Filter means are used for separating the frame signal into a vertical low frequency component and a vertical high frequency component. Means are provided for doubling the frame frequency by a frame progressive operation of the vertical low frequency component. Means are also provided for converting the vertical high frequency component into a second vertical low frequency component by shifting the frequency of the vertical high frequency component, and for converting the vertical high frequency component into a temporal high frequency component by doubling the frequency of the frame signal. The processor also includes means for generating a moving picture signal by combining the temporal high frequency component with the double frame frequency signal produced by the frame progressive operation of the vertical low frequency component.

In another embodiment according to the present invention, a television signal processor has means for splitting an interlace scanning input signal into a first field and a second field. The processor also has means for doubling the first field and the second field by a frame progressive operation. Means are also provided for generating a frame signal, which represents a moving picture, by combining the doubled first field and the doubled second field. Filter means are then used for separating the frame signal into a vertical low frequency component and a vertical high frequency component. The vertical high frequency component is converted into a temporal high frequency component by shifting a frequency of the vertical high frequency component. Finally, means are then used for generating a moving picture signal by combining the temporal high frequency component with the vertical low frequency component.

A television signal processor according to another aspect of the present invention includes a device for converting the frame signal into a double frame-frequency by frame progressive operation.

A television signal processor according to still another aspect of the present invention includes a device for selecting either of the still picture mode and the moving picture mode in response to a motion signal.

According to the television signal processor, information of a frame signal, which has twice the scanning lines as compared to intra-field image processing, can be used by executing a frame combining operation. Thus, a progressive scanning signal with little aliasing noise in the vertical high frequency band is obtained. Also, due to the handling of twice the information, as compared to the intra-field image processing, there is a high flexibility for the design of the vertical direction filter. Thus, a filter which has a sufficient flat passing band can be used.

In the case of the moving picture, the low frequency component of the separated vertical low frequency and high frequency component, which contributes to the image sharpness, can be broaden for sufficiently improving the image sharpness. Further a high-definition picture quality can be obtained. Also, the high frequency component represents the intra-frame (or the intra-field) motion of the input signal. This high frequency component is frequency-shifted to a vertical low and temporal high frequency band, and then combined into the output progressive scanning signal. As a result, an output with a very natural motion can be achieved. Furthermore, as to the still picture which does not include any motion within the frame, the combined frame signal can be directly output.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGURE I is a block diagram showing a conventional system for converting the number of scanning lines;

FIGS. 4(a) through 4(h) are spectrum diagrams in two-dimensional spatial frequency domains shown to illustrate the operation of the system of FIG. 2.

DESCRIPTION OF THE PREFERRED EMBODIMENTS

The present invention will be described in detail with reference to the FIGS. 2, 3 and 4.

Figure 1:
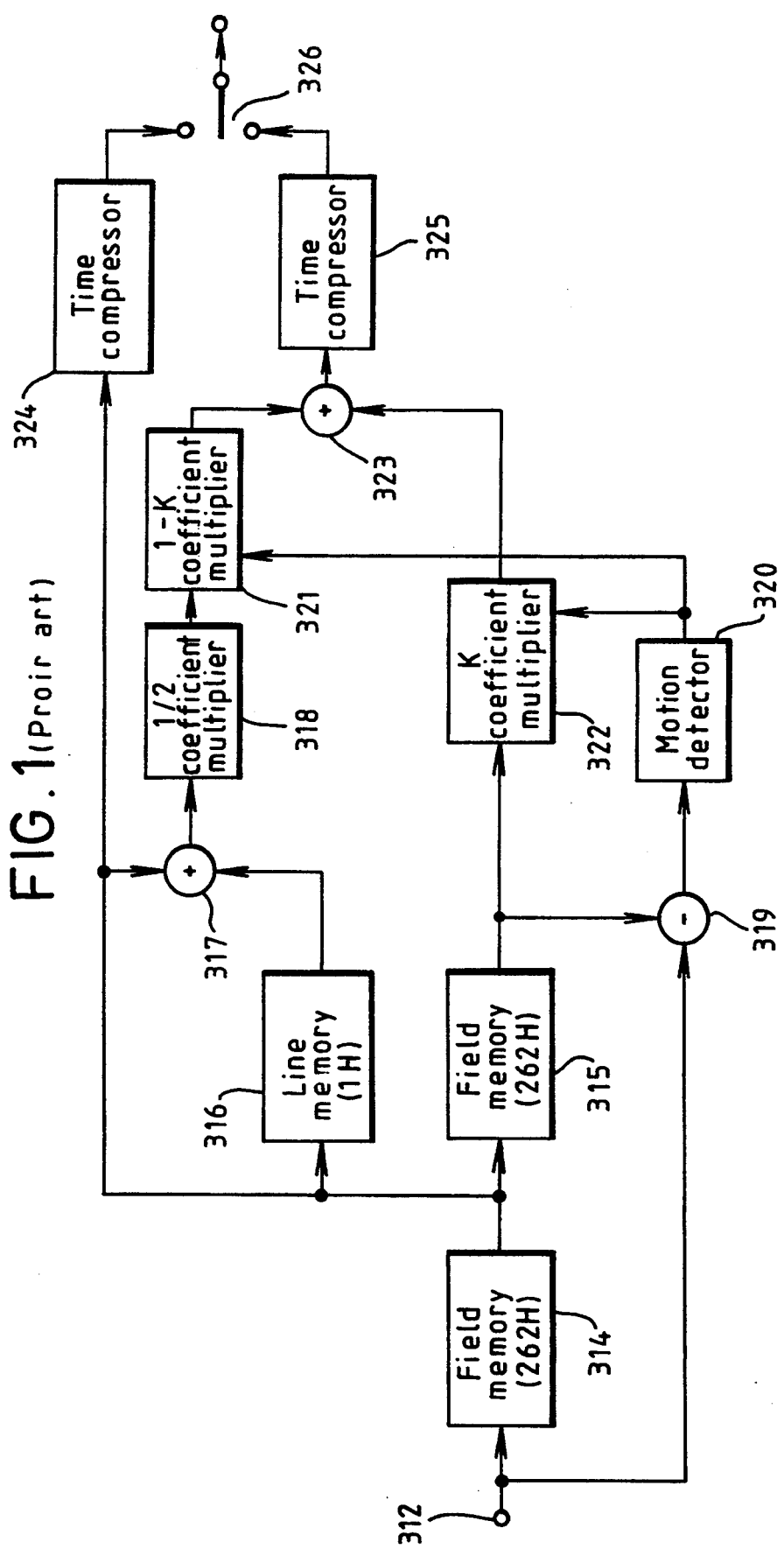
Figure 2:
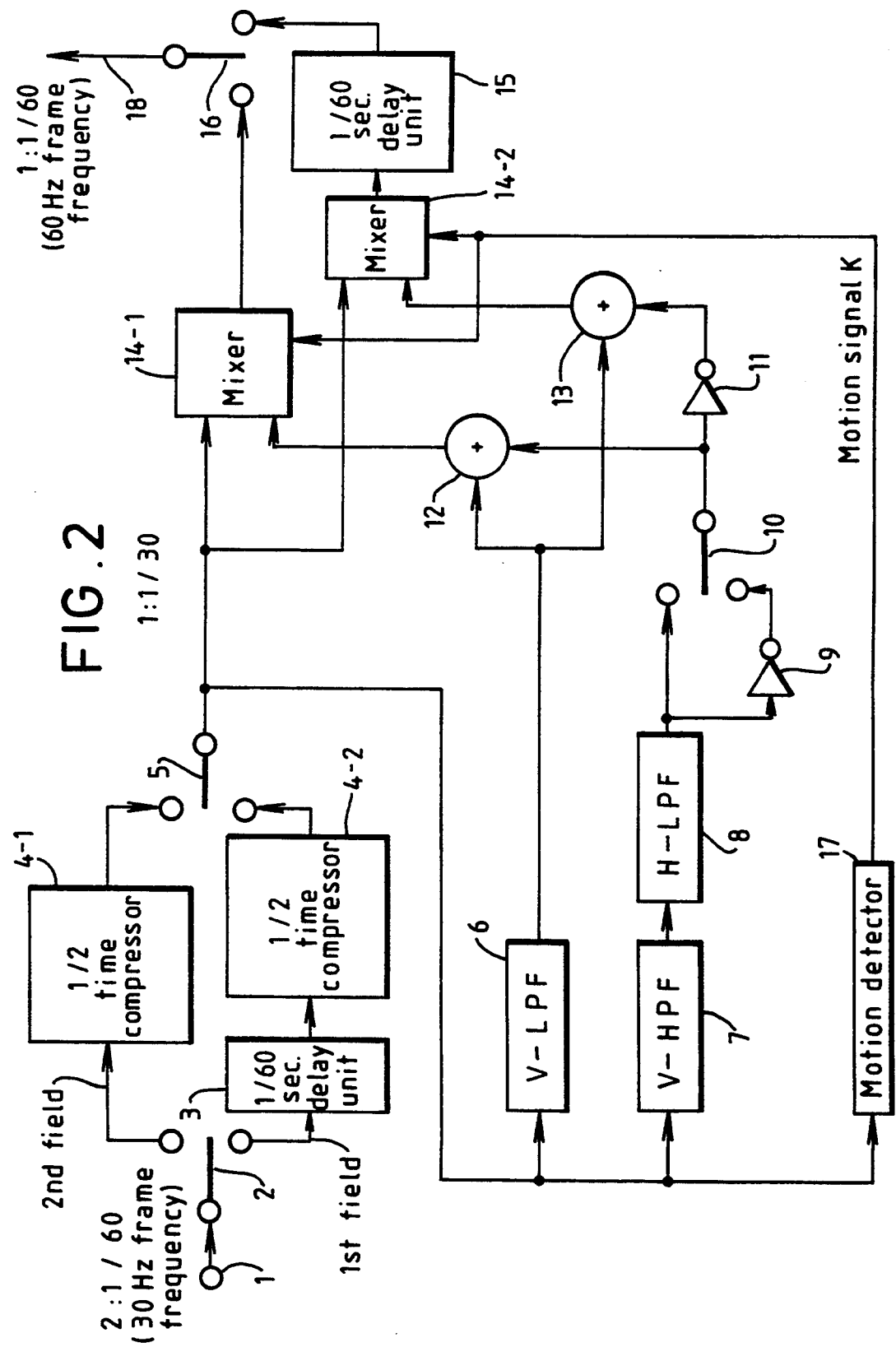
FIG. 2 is a block diagram showing an embodiment of the present invention.
Figure 3A:
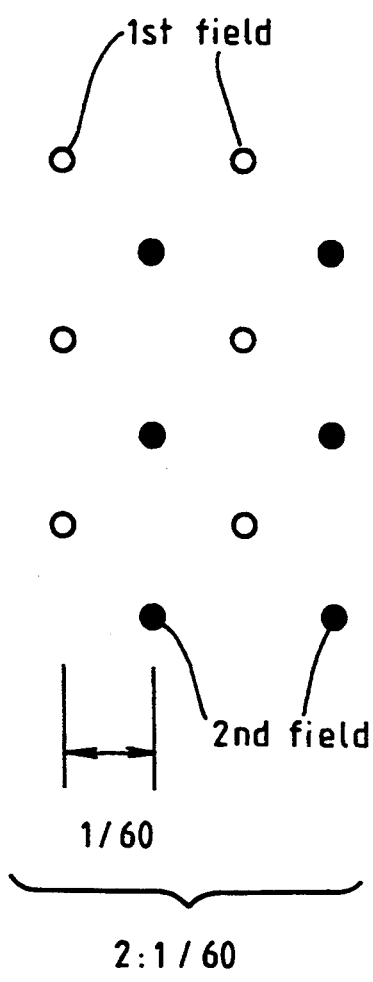
FIGS. 3(a) and 3(b) are diagrams for illustrating the signal and the frame signal after frame combining operation carried out in the system of FIG. 2.
Figure 3B:
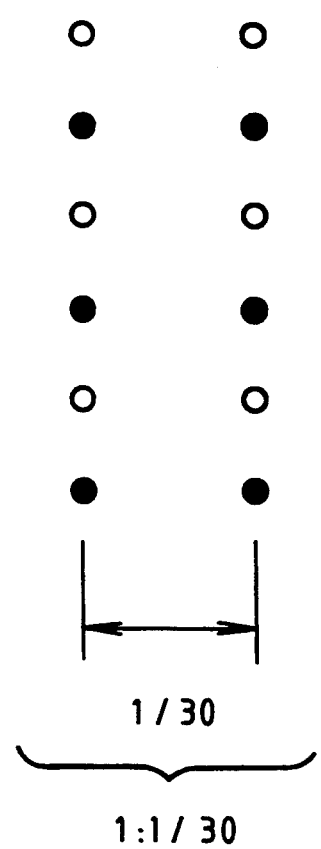

FIG. 2 shows a preferred embodiment of the present invention. A 2:1 interlace scanning signal with 480 lph of effective scanning lines is supplied to input terminal 1. A scanning line arrangement in the vertical time-spatial domain at a 60 Hz field frequency is shown in FIG. 3(a). Switch 2 distributes the interlace scanning signal into two fields, so that the first field is supplied to 1/60 sec. delay unit 3 and the second field is supplied to ½ time compressor 4-1. The delay signal (one field delay signal) output from 1/60 sec. delay unit 3 is supplied to ½ time compressor 4-2. The outputs of ½ time compressors 4-1 and 4-2 are alternately combined together in every line unit by switch 5. The combined signal obtained by switch 5 is outputted as a progressive scanning signal with a frame-frequency the same as the 30 Hz frame-frequency of the input interlace scanning signal, as shown in FIG. 3(b). That is, the first field and second field signals of the interlace scanning signal are combined together to form a progressive scanning frame.

In FIGS. 4, spectrums of signals at the two-dimensional spatial frequency domain in the temporal direction ft Hz and vertical direction fv lph is shown to illustrate the operation of the embodiment.

The interlace scanning signal on input terminal 1 has the spectrum, as shown in FIG. 4(a). Also the output of switch 5 has the spectrum, as shown in FIG. 4(b). The output of switch 5 is supplied to vertical low pass filter (V-LPF) 6 and vertical high pass filter (V-HPF) 7. The output of switch 5 is also supplied to motion detector 17.

Vertical low pass filter 6 extracts the vertical low frequency component, for example, less than fv=360 lph. Thus, the output of vertical low pass filter 6 has the spectrum, as shown in FIG. 4(c). Vertical high pass filter 7 extracts the vertical high frequency component, for example, above fv=360 lph. Thus, the output of vertical high pass filter 7 has the spectrum, as shown in FIG. 4(d). Incidentally, vertical high pass filter 7 may be of the characteristic fv=240 lph.

The output of vertical high pass filter 7 is supplied to horizontal low pass filter (H-LPF) 8, so that the output is limited in its band in the horizontal direction. Horizontal low pass filter 8 is provided for the purpose of reducing influences of noise, since no defects occur on images even if the output of vertical high pass filter 7 is limited to some extent its band in the horizontal direction.

The output of horizontal low pass filter 8 is directly supplied to one of the input terminals of switch 10. The output of horizontal low pass filter 8 is also supplied to the other input terminal of switch 10 via inverter 9. Switch 10 then alternately outputs therefrom the signal input from horizontal low pass filter 8 and the inverted form of the signal input through inverter 9. Thus, the signal output from horizontal low pass filter 8 is inverted in every other line through switch 10. This means that a frequency shift of 240 lph is executed in the vertical spatial frequency. Thus, the output of switch 10 has the spectrum, as shown in FIG. 4(e). The combined signal output from switch 10 is directly supplied to adder 12, while the combined signal is supplied to adder 13 via inverter 11.

Adders 12 and 13 are also coupled to vertical low pass filter 6 for receiving its output. Thus, in adder 12 the signal output from switch 10 is combined with the output of vertical low pass filter 6, While in adder 13 the inverted form of the output of switch 10 is combined with the output of vertical low pass filter 6. The outputs of adders 12 and 13 are supplied to a respective one of the data inputs of mixers 14-1 and 14-2, respectively. Other data inputs of mixers 14-1 and 14-2 are coupled to the output of switch 5, while their control inputs are coupled to motion detector 17 which detects a motion in the signal output from switch. Thus, mixer 14-1 mixes the still picture signal from switch 5 and the moving picture signal from adder 12 under the control of the motion signal K. Mixer 14-2 mixes the still picture signal from switch 5 and the inverted form of the moving picture signal from adder 13 under the control of the motion signal K. Motion detector 17 produces the motion signal from the output of switch 5. Motion signal K is a decimal between 0 and 1. In the case of a complete moving picture, the motion signal is assigned a 1 (K=1), so that only the outputs from adders 12 and 13 are selected by mixers 14-1 and 14-2. In the case of a complete still picture, the motion signal is assigned a 0 (K=0), so that only the output from switch 5 is selected by mixers 14-1 and 14-2.

The output of mixer 14-1 is directly supplied to one of the input terminals of switch 16. The output of mixer 14-2 is supplied to the other input terminal of switch 16 via 1/60 sec. delay unit 15 which delays the output of mixer 14-2 by 1/60 sec. Here, switch 16 alternately selects the signal on the input terminals every 1/60 sec. By this means, a progressive scanning signal with the 60 Hz frame-frequency is obtained on output lead 18.

In case of the still picture mode, the output (1:1 progressive scanning/30 Hz) of switch 5 is passed from mixers 24-2 and 14-2. This is converted to a double frame-frequency signal (1:1/60 Hz) by 1/60 sec. delay unit 15 and switch 16.

The case of the moving picture mode, will now be discussed.

The vertical low frequency component is processed by the system of vertical low pass filter 6, adders 12 and 13, mixer 14-1 and 14-2, 1/60 sec. delay unit 15 and switch 16. Therefore, the vertical low frequency component is doubled in its frame frequency (1:1/60 Hz). Thus, this vertical low frequency component at output terminal 16 has a spectrum, as shown in FIG. 4(f). On the other hand, the vertical high frequency component is processed through a vertical frequency shift by the system of inverter 9 and switch 10. Thus, the vertical high frequency component has a spectrum, as shown in FIG. 4(e) which is changed from the spectrum, as shown in FIG. 4(d). Furthermore, the vertical high frequency component is processed by double frame conversion. In this double frame conversion process the field (or frame) inverted by inverter 11 is delayed by 1/60 sec. delay unit 15. That is, in the execution of the frame progressive operation one of the frames has been inverted. As a result, the vertical high frequency component is processed by a frequency operation in the vertical direction and a frequency shift operation in the temporal direction by 30 Hz. Therefore, the vertical high frequency component on output lead 18 has a spectrum, as shown in FIG. 4(g), which is converted from the vertical direction to the temporal direction.

As described above, respective components are present on output lead 18. Since the output of vertical low pass filter 6 and the output of switch 10 have been processed in a linear operation, a principle of superposition is established. Accordingly, the output of switch 16 has a spectrum, as shown in FIG. 4(h). As seen from the spectrum of FIG. 4(h), a progressive scanning frame signal with 480 lines and 60 Hz frame-frequency is obtained from output lead 18.

Since the signal processings in this embodiment are all carried out in a linear operation, the same effect can be achieved even if the sequence of the signal processings of the respective filterings and the time compression processings has been altered. Although the above description has been made with the system for converting the interlace scanning signal with 480 lph effective scanning lines and 30 Hz frame-frequency to the progressive scanning signal, it is apparent that the present invention can naturally be applied to interlace scanning signals with other formats.

As described above, since conventional signal processing in the moving picture mode was confined to signal within the same field, it was difficult to obtain the vertical resolution at or above 240 lph. However in the signal processing according to the present invention, all information within one frame (i.e., inter-field image processing) can be utilized by the frame combining operation so that the vertical resolution above 240 lph can be achieved. Also, motion information (e.g, in the form of the vertical high frequency component) is transferred to the temporal high frequency component in the progressive scanning signal by the processes of the band separation, the frequency-shift, etc. In other words, the motion information is reproduced in the temporal frequency region. Thus, unnatural motions do not occur in the progressive scanning signal with the double frame-frequency.

As described above, the present invention is able to provide an extremely preferable television signal processor for converting interlace scanning signals to progressive scanning signals in which the picture quality of the moving picture can be greatly improved in comparison with conventional systems.

While preferred embodiments have been illustrated and described, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A television signal processor comprising:
   means for generating a frame signal, which represents a moving picture, by combining a first field and a second field of an interlace scanning input signal;
   filter means for separating the frame signal into a vertical low frequency component and a vertical high frequency component;
   means for converting the frame frequency by a frame doubling operation of the vertical low frequency component;
   means for converting the vertical high frequency component into a second vertical low frequency component by shifting the frequency of the vertical high frequency component, and for converting the vertical high frequency component into a temporal high frequency component by a polarity alternated doubling operation of the frame signal; and
   means for generating a moving picture signal by combining the temporal high frequency component with the double frame frequency signal produced by the frame doubling operation of the vertical low frequency component.

2. A television signal processor according to claim 1, further comprising:
   means for generating a still picture signal, which is representative of a still picture, by converting the frequency of the frame signal using the frame doubling operation.

3. A television signal processor according to claim 2, further comprising:
   a motion detector for receiving the frame signal and for outputting an image motion detection signal; and
   means for mixing the moving picture signal and the still picture signal in accordance with a mixture ratio, the mixture ratio being controllable in accordance with the image motion detection signal outputted from the motion detector.

4. A television signal processor comprising:
   means for splitting an interlace scanning input signal into a first field and a second field;
   means for doubling the first field and for doubling the second field by a frame doubling operation;
   means for generating a frame signal, which represents a moving picture, by combining the doubled first field and the doubled second field;
   filter means for separating the frame signal into a vertical low frequency component and a vertical high frequency component;
   means for converting the vertical high frequency component into a temporal high frequency component by shifting a frequency of the vertical high frequency component; and
   means for generating a moving picture signal by combining the temporal high frequency component with the vertical low frequency component.

5. A television signal processor according to claim 4, further comprising:
   means for generating a still picture signal, which is representative of a still picture, by doubling the frequency of the frame signal using the frame doubling operation.

6. A television signal processor according to claim 5, further comprising:
   a motion detector for receiving the frame signal and for outputting an image motion detection signal; and
   means for mixing the moving picture signal and the still picture signal in accordance with a mixture ratio, the mixture ratio being controllable in accordance with the image motion detection signal outputted from the motion detector.

7. A television signal processor comprising:
   means for producing a frame signal from an interlace scanning input signal;
   filter means for producing a vertical low frequency component and a vertical high frequency component in accordance with the frame signal, the vertical low frequency component having a frequency which is equal to the frequency of the interlace scanning input signal;
   means for converting the vertical high frequency component into a temporal high frequency component, the temporal high frequency component having a frequency which is equal to the frequency of the interlace scanning input signal; and
   means for generating a moving picture signal by combining the temporal high frequency component with the vertical low frequency component.

* * * * *